Nov. 7, 1933.  P. WURZBURGER  1,934,394
TIGHTENING MEANS FOR CONNECTING MEMBERS
OF HIGH PRESSURE LUBRICATING DEVICES
Filed Dec. 19, 1931
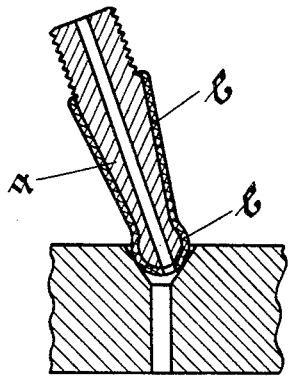
Fig:1
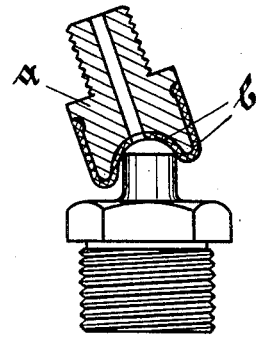
Fig:2
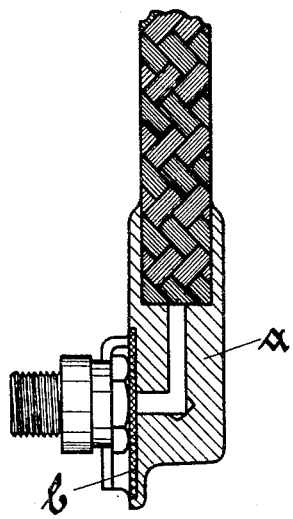
Fig:3
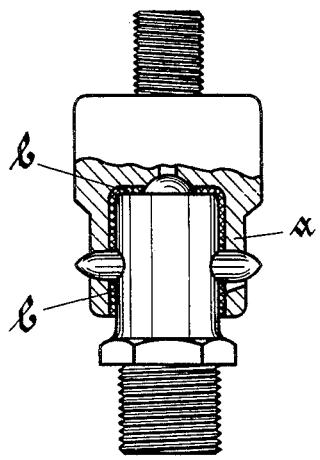
Fig:4
INVENTOR:
Paul Wurzburger Patented Nov. 7, 1933

1,934,394

UNITED STATES PATENT OFFICE 1,934,394

TIGHTENING MEANS FOR CONNECTING MEMBERS OF HIGH PRESSURE LUBRICATING DEVICES

Paul Wurzburger, Wiesbaden, Germany

Application December 19, 1931, Serial No. 582,099, and in Germany July 3, 1931

2 Claims. (Cl. 285—161)

It has been impossible to now to obtain a tight seat in high pressure lubricating devices where two metal parts (such as for example pump spout and nipple) have to be pressed against each other. Metal gaskets, even if their surfaces are most carefully treated, are not sufficiently reliable at the high pressures that occur in connection with the afore indicated lubricating devices inasmuch as it is impossible to obtain perfectly even surfaces and that a small quantity of the lubricant will always escape through the small passages that form on these surfaces. Gaskets which have specially treated surfaces inserted in them will in most cases become too big in size and result too high in cost of manufacture.

In accordance with the present invention, the surfaces of the two metallic parts (pump spout and nipple, for example) or one of these surfaces are covered with a thin coat of a plastic material that shows about the same hardness as leather, and this material is applied to the metal part by a process that ensures a good sticking of it on the metallic surface, as for example by vulcanizing or the like. The material with which the metal is coated may be a rubber containing mass that is, as far as possible, not attacked by the acids of the oil or of the grease, as for example an appropriate kind of ebonite or similar material. The coat of the said material must be equal in hardness to leather, it must be tough and in no case brittle and only yield to a slight measure under pressure. Too hard a coat would show the same disadvantages as a metal gasket and it moreover will crack and come off when subjected to high pressure. On the other hand the coat would be crushed or deformed if it is too smooth, and thereby be unable to serve its purpose after a short while. The coat can be applied to the outer or to the inner surfaces of the metal part as circumstances may require; it may also be applied by simply dipping the respective part into an appropriate solution or by spraying the solution on to the parts or by any other process. The coat is then in its wet condition vulcanized so as to obtain a reliable sticking on the metal part. The metal part (pump spout or nipple for example) which has been coated in this way is able to stand high pressures, and it at the same time ensures a tight fit owing to the slight plasticity of the surface layer that tends to compensate and to equalize any small unevenness.

The accompanying drawing shows by way of example a number of connecting parts which have their pressure bearing surfaces coated with a plastic layer. Both pressure bearing parts, the connecting piece of the pump and the nipple, or one of them only may be coated in the afore mentioned way.

Fig. 1 is a section through a pump spout and a simple lubricating opening. The conically shaped spout with ball head is coated on the outer side.

Fig. 2 is a section through a pump spout that fits to a nipple shown in front view. This spout is of a rounded off form and the entire outside part has been coated.

Fig. 3 is a section through a hose connecting part that is fitted to a lubricating nipple shown in front view. The surface of the hose connecting part that bears on the lubricating nipple has been coated.

Fig. 4 is a section through a cylindrically bored out connecting part which is fitted by a so called bayonet attachment to a cylindrical lubricating nipple shown in front view. The cylindrical bore and its bottom part have been coated.

In all the illustrations $a$ designates the metallic body and $b$ the hard and somewhat plastic coat. The coat may instead of being made of a rubber containing material, also consist of an oil-cellulose lac or a celluloid mixture or the like which can be applied to the surface in any appropriate manner and by any appropriate process. Special attachment means made of metal being not needed, the cost of manufacture of these connecting parts and nipples will be considerably reduced.

Having thus described my invention what I claim as new and desire to secure by Letters Patent is:

1. A discharge nozzle for high pressure lubricating systems comprising a seating portion having a relatively thin coating of relatively elastic material vulcanized to said portion and covering the surface thereof which is adapted to make lubricant-tight sealing contact with a lubricant-receiving fitting.

2. A discharge nozzle for high pressure lubricating systems having a part constructed and arranged to engage a lubricant receiving fitting, said part having a coating of relatively compressible material covering it to form a sealing medium between the part and a fitting, the adhesion between said coating and said part being the sole force tending to hold said coating in place upon said part.

PAUL WURZBURGER.